United States Patent [19]
Doty

[11] 3,710,427
[45] Jan. 16, 1973

[54] COLLAR PULLER FOR METAL PIPE
[76] Inventor: John T. Doty, 9936 E. Ramona Ave., Bellflower, Calif. 90607
[22] Filed: Aug. 26, 1971
[21] Appl. No.: 175,147

[52] U.S. Cl. ............................................. 29/237
[51] Int. Cl. .......................................... B23p 19/02
[58] Field of Search .............. 29/237; 254/29, 30, 31

[56] References Cited

UNITED STATES PATENTS

| | | | |
|---|---|---|---|
| 2,670,174 | 2/1954 | Lucker | 29/237 |
| 2,958,125 | 11/1960 | Nichols | 29/237 |
| 3,281,929 | 11/1960 | Shinnick | 29/237 |
| 3,364,555 | 1/1968 | Swink | 29/237 |
| 3,653,115 | 4/1972 | Perkins | 29/237 |

Primary Examiner—Robert C. Riordon
Assistant Examiner—J. C. Peters
Attorney—Harold A. Dreckman

[57] ABSTRACT

When handling large diameter metal pipe of an industrial nature, the various sections of the pipe are connected by collars and these collars must be moved horizontally while the pipe is in a ditch or the like; thus requiring that the pipe gripping tongs shall securely engage the metal pipe without slipping when a force is applied to the tongs. Also when installing metal pipe the pipe sometimes extends at an angle, thus requiring an arcuate collar. The collar puller, therefore, must be flexible to align the coupling with one section of the metal pipe.

6 Claims, 8 Drawing Figures

INVENTOR.
JOHN T. DOTY

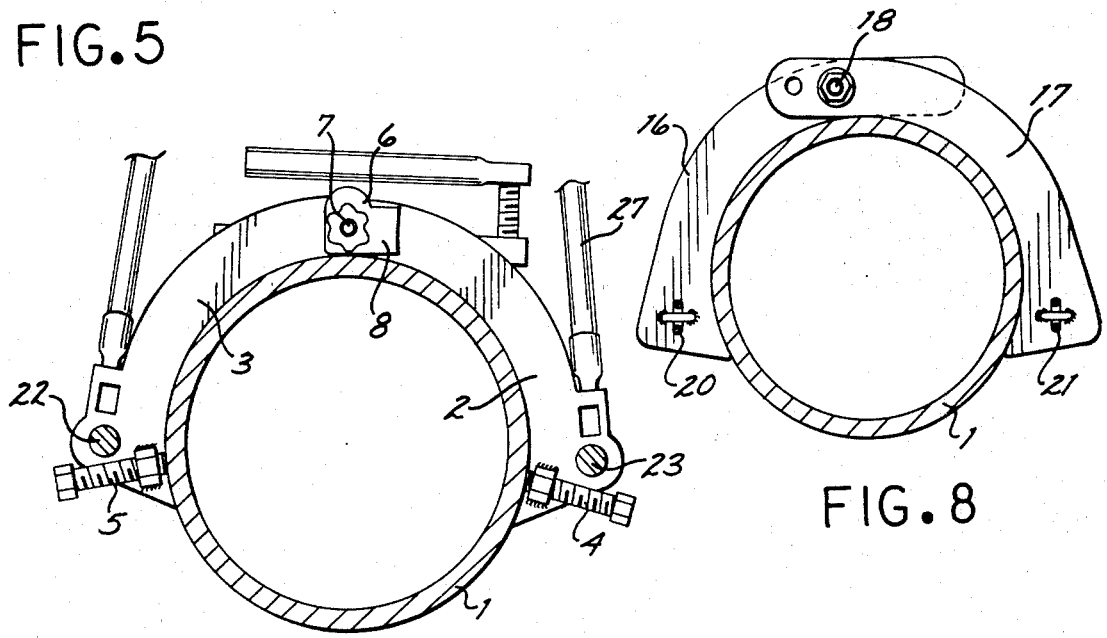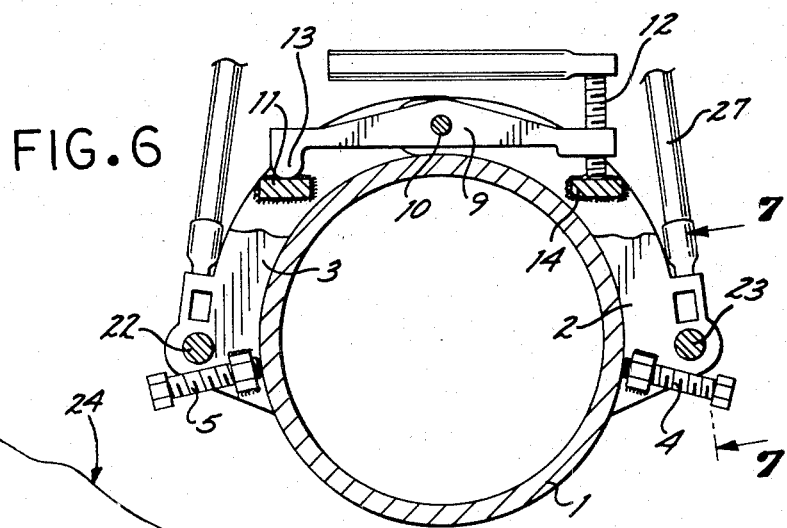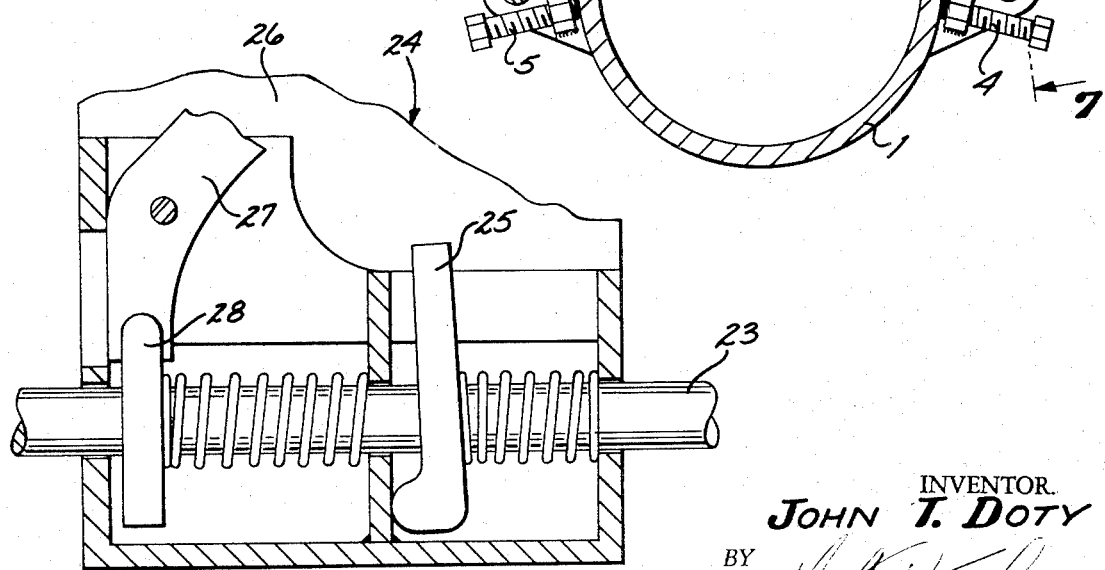

COLLAR PULLER FOR METAL PIPE

An object of my invention is to provide a novel collar puller for metal pipe in which the tongs are provided with threaded pins which securely engage and grip the pipe collar.

Another object of my invention is to provide a pipe gripping element of the tongs which is connected to the tong actuating structure by a variable means, such as a chain, to permit alignment of parts of the tongs.

Still another object is to provide a novel means of varying the diameter of the tongs to fit different sized pipe.

Other objects, advantages and features of invention may appear from the accompanying drawings, the subjoined detailed description and the appended claims.

In the drawing:

FIG. 5 is a transverse sectional view of the pipe engaging element of the tongs.

FIG. 6 is a sectional view taken on line 6—6 of FIG. 3.

FIG. 7 is a sectional view taken on line 7—7 of FIG. 6.

FIG. 8 is a sectional view taken adjacent fingers 16,17 of FIG. 1.

Figure 1:
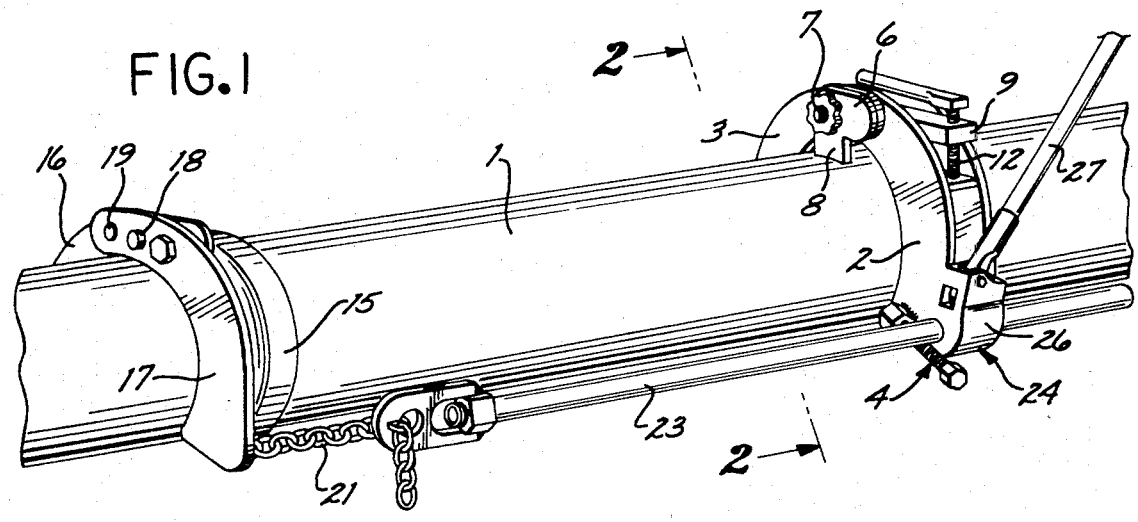
FIG. 1 is a perspective view of my tongs in operative position.
Figure 2:
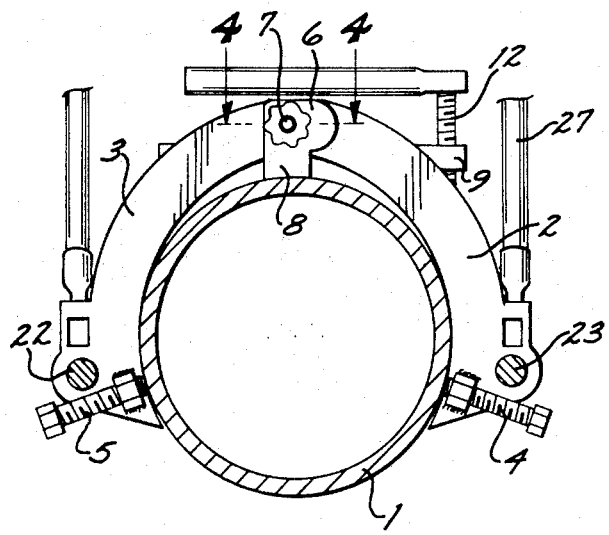
FIG. 2 is a sectional view taken on line 2—2 of FIG. 1.
Figure 3:
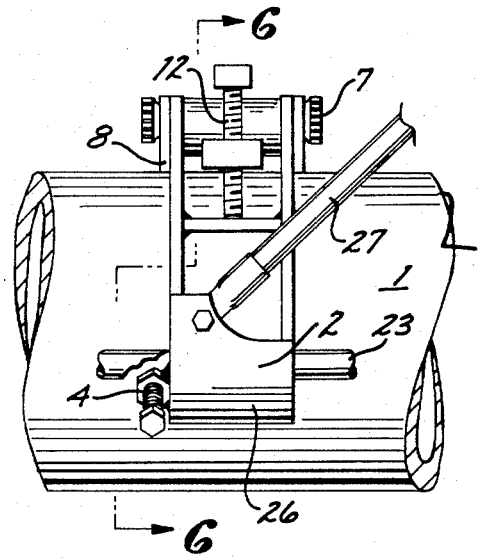
FIG. 3 is a fragmentary side view of the pipe engaging collar.
Figure 4:
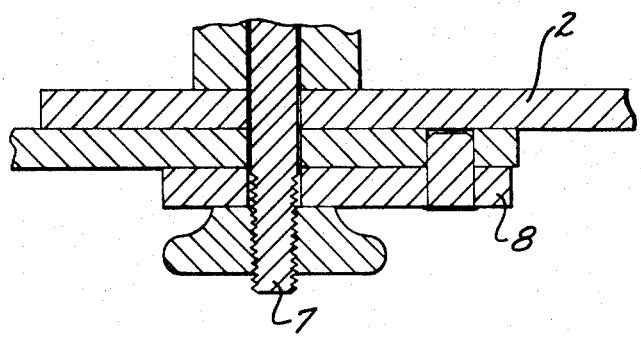
FIG. 4 is a fragmentary sectional view taken on line 4—4 of FIG. 2.

Referring more particularly to the drawing, my pipe gripping tongs are adapted to engage a pipe 1 through an arc somewhat greater than 180°. The main gripping portion of the tongs consists of a first arcuate shoe 2 and a second arcuate shoe 3. A threaded screw or bolt 4 is threaded through the shoe 2 adjacent the lower end thereof and this screw tightly engages the pipe 1 to prevent longitudinal slipping of the tongs during its operation. A similar screw or bolt 5 is threaded through the shoe 3 and also engages the pipe 1, as shown in FIGS. 2, 3, 5 and 6. When the set screws 4 and 5 are securely clamped against the pipe 1 the tongs will be held in fixed position relative to the pipe, as will be evident. Cast iron pipe come in various diameters, and to accommodate the same set of tongs to slightly different diameter pipe I provide a coupling plate 6 which is pivotally attached to the shoes 2 and 3 by the bolt 7. A finger 8 is integrally formed on the coupling 6 and this finger can be rotated to engage the pipe 1 or disengage the same as desired. In one position the finger 8 will raise the shoes 2 and 3 slightly above the upper surface of the pipe 1, thus accommodating the tongs to somewhat smaller diameter pipe. In the position of the finger 8, shown in FIG. 5, a larger diameter pipe would be accommodated. To cause the shoes 2 and 3 to swing inwardly and grip the pipe 1, I provide a manually operable camming means consisting of a cam arm 9 which is pivotally mounted on the pin 10. This construction is best shown in FIG. 6. One end of the cam arm 9 engages a fixed lug 11 which projects inwardly from the shoe 3. A bolt 12 is threaded through the cam arm 9 at the end opposite the finger 13 which engages the lug 11. The bolt 12 engages an inwardly projecting lug 14 on the shoe 2, thus causing the shoes 2 and 3 to swing inwardly when the bolt 12 is screwed downwardly, causing the cam arm 9 to swing on the pin 10. Thus it is possible to securely clamp the tongs onto the pipe with the assistance of the set screws 4 and 5. The tongs can only be released by unscrewing the set screws 4–5 and the bolt 12.

To properly engage the collar 15 on the pipe 1, I provide a pair of arcuate fingers 16 and 17 which partially encircle the collar 15. The fingers 16 and 17 are pivotally coupled by the pin 18 and can be adjusted by placing the bolt in spaced holes 19. A chain 20 is attached to the lower end of the finger 16 and a similar chain 21 is secured to the finger 17. The chain 20 is attached to the outer end of an actuating bar 22 and the chain 21 is similarly attached to the outer end of the bar 23. When the actuating bars 22 and 23 are manually moved horizontally the collar 15 will be pulled onto the pipe 1 by means of the fingers 16 and 17 which grip the collar. Due to the chain coupling between the fingers 16–17 and the bars 22–23 the fingers will properly align themselves and will properly pull the collar 15 in place without binding that collar on the pipe. Thus an angular collar can be pulled onto a section of pipe with no binding difficulty.

A ratchet type jack 24 consists of a finger 25 which encircles the bar 23 and is pivotally mounted in the box 26, which is an integral part of the shoe 2 or 3. A jack handle 27 is mounted on the finger 28 which moves this finger step by step on the bar 23, thus causing the bar to be pulled horizontally towards the tong shoes 2 and 3. The backup finger 25 alternately engages the bar 23 to prevent accidental retraction of this bar, and also prevent the bar from movement while a new "bite" is being taken by the finger 28.

IN OPERATION

The tong shoes 2 and 3 are first placed in a position to partly encircle the pipe 1, as shown in FIG. 1. The bolt 12 is now screwed downwardly to cause the cam arm 9 to swing on the pivot 7 while bearing against the lugs 11 and 14. The set screws 4 and 5 are now screwed inwardly to engage the pipe 1 and securely hold the tongs in position. If a pipe collar 15 is to be placed on the pipe the fingers 16 and 17 will engage the collar, as shown in FIG. 1; after which the ratchet type jacks 24 are manually operated to pull the bars 23 towards the tongs until the collar 15 is in position. Since there are two ratchet type jacks on the tongs the bats 23 can be moved independently so that the collar 15 can be moved onto the pipe 1 without binding.

Having described my invention, I claim:

1. A collar puller for metal pipe comprising a pair of arcuate shoes, means pivotally mounting said shoes to each other, a bolt threaded through each of the shoes adjacent the outer end of each of the shoes, each of said bolts engaging the metal pipe, an actuating bar slidably mounted on each of the shoes, and means engaging each of said bars to motivate said bars in a direction parallel to the pipe.

2. A collar puller for metal pipe as recited in claim 1, and a coupling plate, means pivotally attaching the coupling plate to said shoes, a finger on the coupling plate, said finger engaging the metal pipe in one position of the parts.

3. A collar puller for metal pipe as recited in claim 1, and a pair of arcuate fingers partly encircling the pipe and spaced longitudinally from said arcuate shoes, means pivotally mounting said fingers to each other, and means coupling each of said fingers to one of said bars.

4. A collar puller for metal pipe as recited in claim 1, and a coupling plate, means pivotally attaching the coupling plate to said shoes, a finger on the coupling plate, said finger engaging the metal pipe in one position of the parts, and said means coupling the fingers to a bar comprising a chain attached to a finger and to a bar.

5. A collar puller for metal pipe as recited in claim 1, said means to motivate the bars consisting of a ratchet type jack mounted on each of said shoes and engaging a bar.

6. A collar puller for metal pipe as recited in claim 1, and a pair of arcuate fingers partly encircling the pipe and spaced longitudinally from said arcuate shoes, means pivotally mounting said fingers to each other, and means coupling each of said fingers to one of said bars, and a coupling plate, means pivotally attaching the coupling plate to said shoes, a finger on the coupling plate, said finger engaging the metal pipe in one position of the parts, and said means coupling the fingers to a bar comprising a chain attached to a finger and to a bar.

* * * * *